United States Patent
Kobayashi (10) Patent No.: US 8,950,721 B2
(45) Date of Patent: Feb. 10, 2015

(54) SECURING MEMBER

(75) Inventor: Shuichi Kobayashi, Takahama (JP)

(73) Assignee: Yanegijutsukenkyujo Co., Ltd., Takahama-Shi, Aichi-Ken (JP)

( * ) Notice: Subject to any disclaimer, the term of this patent is extended or adjusted under 35 U.S.C. 154(b) by 19 days.

(21) Appl. No.: 13/806,125

(22) PCT Filed: Apr. 11, 2011

(86) PCT No.: PCT/JP2011/058998
§ 371 (c)(1),
(2), (4) Date: Dec. 20, 2012

(87) PCT Pub. No.: WO2012/005037
PCT Pub. Date: Jan. 12, 2012

(65) Prior Publication Data
US 2013/0092806 A1   Apr. 18, 2013

(30) Foreign Application Priority Data

Jul. 6, 2010   (JP) ................................ 2010-153563

(51) Int. Cl.
*E04D 13/18* (2014.01)
*H01L 31/042* (2014.01)
*F16M 13/02* (2006.01)
(Continued)

(52) U.S. Cl.
CPC .............. *F16M 13/02* (2013.01); *F24J 2/5245* (2013.01); *F24J 2/5254* (2013.01); *F24J 2/5256* (2013.01); *F24J 2/5262* (2013.01); *H01L 31/0482* (2013.01); *Y02B 10/12* (2013.01); *Y02E 10/50* (2013.01); *Y02E 10/47* (2013.01)
USPC ....... 248/500; 248/205.1; 52/173.3; 126/569; 136/244

(58) Field of Classification Search
USPC ............... 248/205.1, 500; 136/246, 244, 251; 126/569; 52/173.3, 461
See application file for complete search history.

(56) References Cited

U.S. PATENT DOCUMENTS 5,076,035 A * 12/1991 Wright ............................. 52/464
5,571,338 A * 11/1996 Kadonome et al. ........... 136/251
(Continued)

FOREIGN PATENT DOCUMENTS

JP   11-141096 A   5/1999
JP   11-240397 A   9/1999
(Continued)

OTHER PUBLICATIONS

International Search Report mailed on Jun. 7, 2011 for corresponding International Application No. PCT/JP2011/058998.

*Primary Examiner* — Anita M King
(74) *Attorney, Agent, or Firm* — Yoshida & Associates, LLC (57) ABSTRACT

Provided is a securing member which can secure a plate-like module reliably and has high versatility. A securing member includes an upper piece that extends in a right-left direction, a shaft portion that extends downward from the upper piece, a lower piece that extends to both sides from a lower end of the shaft portion so as to be larger than the upper piece and has a curved bottom surface, and a mounting hole that penetrates through the lower piece at one side. The lower piece is mounted on a mounting target through the mounting hole in a state where a side surface of a plate-like module is made to substantially abut against the shaft portion so that the upper piece is lowered to abut against the upper surface of the plate-like module and the lower piece abuts against the lower surface of the plate-like module.

11 Claims, 9 Drawing Sheets

(51) Int. Cl.
*F24J 2/52* (2006.01)
*H01L 31/048* (2014.01)

(56) References Cited

U.S. PATENT DOCUMENTS

| | | | | |
|---|---|---|---|---|
| 5,957,568 | A * | 9/1999 | Byers | 362/235 |
| 6,105,317 | A * | 8/2000 | Tomiuchi et al. | 52/173.3 |
| 6,460,820 | B1 * | 10/2002 | Kopp | 248/500 |
| 7,956,280 | B2 * | 6/2011 | Kobayashi | 136/251 |
| 8,181,402 | B2 * | 5/2012 | Tsuzuki et al. | 52/173.3 |
| 8,404,963 | B2 * | 3/2013 | Kobayashi | 136/244 |
| 8,413,946 | B2 * | 4/2013 | Hartelius et al. | 248/500 |
| 8,453,394 | B2 * | 6/2013 | Kobayashi | 52/173.3 |
| 8,511,008 | B2 * | 8/2013 | Sagayama | 52/173.3 |
| 8,572,909 | B2 * | 11/2013 | Rivera et al. | 52/173.3 |
| 8,590,235 | B2 * | 11/2013 | Resso et al. | 52/302.1 |
| 2008/0302407 | A1 * | 12/2008 | Kobayashi | 136/251 |

FOREIGN PATENT DOCUMENTS

| | | |
|---|---|---|
| JP | 2002-252364 A | 9/2002 |
| JP | 2007-165499 A | 6/2007 |
| JP | 2007-262764 A | 10/2007 |
| JP | 2009-167793 A | 7/2009 |
| JP | 2011-080199 A | 4/2011 |

* cited by examiner

SECURING MEMBER

This is a 371 national phase application of International Application No. PCT/JP2011/058998 filed Apr. 11, 2011 claiming priority upon Japanese Patent Application No. 2010-153563 filed Jul. 6, 2010, of which full contents are incorporated herein by reference.

BACKGROUND OF THE INVENTION

1. Field of the invention

The present invention relates to a securing member for securing a plate-like module such as a solar-powered water heater and a solar cell module onto the roof or the like.

2. Description of the related art

Conventionally, for example, as a securing member for installing and securing a solar cell module as a plate-like module onto roof, a securing member as described in Patent Document 1 (see, Japanese Patent Application Laid-open No. 2007-165499) has been proposed. The securing member as disclosed in Patent Document 1 includes a to-be boded portion, a shaft portion, and a base portion. The to-be boded portion is inserted into a recessed bonding portion formed on a side surface of a frame body of the solar cell module. The shaft portion droops from a center of the to-be boded portion. The base portion is connected to a lower end of the shaft portion and the frame body of the solar cell module is placed on an upper surface of the base portion.

With the securing member, in a state where the securing member is mounted on a mounting target such as a roofboard and a roof tile, the frame body of the solar cell module at one end side is supported on the base portion and the to-be boded portion of the securing member. Then, another securing member is mounted on the frame body of the solar cell module at the other end side, and the securing member is mounted on the mounting target. In this manner, the solar cell module can be secured onto the roof or the like. Accordingly, a plurality of solar cell modules can be secured sequentially from one side (eaves side) to the other side (ridge side) of the mounting target, thereby reducing cost relating to installation of the solar cell module.

Further, the securing member as disclosed in Patent Document 1 includes a claw-like to-be engaged portion at one side of both sides with respect to the shaft portion on the securing member, which is the opposite side to a portion to be mounted on the mounting target. In addition, an engaging portion which is engaged with the to-be engaged portion is provided on the frame body of the solar cell module. The to-be engaged portion is engaged with the engaging portion so as to restrict the frame body from moving in the direction of being farther from the shaft portion. With this, when the solar cell module is installed on inclined roof or the like, the solar cell module arranged at the eaves side (lower side) can be prevented from moving to the eaves side with the securing member which supports the ridge side (upper side) of the solar cell module. This makes it possible to support a load of the solar cell module with the securing members at the eaves side and the ridge side.

However, with the conventional securing member as disclosed in Patent Document 1, the frame body of the solar cell module is inserted into between the base portion and the to-be-bonded portion of the securing member only. Therefore, there has been a risk that the solar cell module rattles depending on dimensional tolerance thereof or the solar cell module slides in the direction in which the securing member extends.

Further, in the securing member as disclosed in Patent Document 1, the claw-like to-be engaged portion is engaged with the engaging portion provided on the frame body of the solar cell module. Therefore, when the solar cell module including no engaging portion is used, there is a problem that the load of the solar cell module at the eaves side cannot be supported with the securing member at the ridge side. Therefore, when the solar cell module is installed on inclined roof or the like, a solar cell module including an engaging portion is required to be used. Accordingly, the securing member lacks versatility.

SUMMARY OF THE INVENTION

The present invention has been made in view of the above-mentioned circumstances, an object thereof is to provide a securing member which can secure a plate-like module such as a solar cell module reliably and has high versatility.

In order to achieve the above-mentioned object, according to an aspect of the invention, there is provided "a securing member including an upper piece that is capable of abutting against an upper surface of a plate-like module or is capable of being inserted into a groove formed on a side surface of the plate-like module, and extends in a right-left direction, a shaft portion that extends downward from a center of the upper piece, a lower piece that extends to both sides from a lower end of the shaft portion so as to be larger than the upper piece and has an abutment portion which is capable of abutting against a lower surface of the plate-like module on an upper portion of the lower piece, and a mounting hole that is formed on the lower piece at one side of both sides with respect to the shaft portion and penetrates through the lower piece in an up-down direction, wherein the lower piece is mounted on a mounting target of the plate-like module through the mounting hole in a state where the side surface of the plate-like module is made to abut against or be close to the shaft portion so that the upper piece is lowered to abut against the upper surface of the plate-like module or a surface in the groove and the abutment portion of the lower piece abuts against the lower surface of the plate-like module."

As the "plate-like module", a "solar cell module formed by surrounding an outer circumference of a plate-like solar cell panel with a frame body", a "solar-powered water heating panel", a "solar heat collection panel", a "soundproof panel", a "light shielding panel", and the like can be exemplified.

Further, as the "lower piece", a "lower piece of which thickness in the up-down direction is increased as is farther from the shaft portion and upper portions at front end sides farther from the shaft portion are formed as abutment portions", a "lower piece on which portions extending upward are formed at front end sides farther from the shaft portion and upper surfaces of the portions are formed as abutment portions", and the like can be exemplified.

Further, as the "mounting target", a "roof tile forming a surface of roof", a "roofboard on which the roof tile is mounted", a "roof structural member for forming the roof such as a rafter ", a "long crosspiece member mounted on a target on which the plate-like module is installed", a "mount mounted on a target on which the plate-like module is installed", a "mounting clasp interposed between the plate-like module and a target on which the plate-like module is installed" a "wall surface", a "furring strip for constituting a wall surface", and the like can be exemplified.

Moreover, as the expression "the lower piece is mounted on the mounting target through the mounting hole", a case where "a bolt, a screw, or the like is inserted through the mounting hole from the upper side of the lower piece and the lower piece is pressed to the side of the mounting target with a head of the bolt or the like so as to be mounted", a case where "an external thread portion projecting from the side of the mounting target is inserted through the mounting hole from the lower side of the lower piece and the lower piece is pressed to the side of the mounting target with a nut screwed into the external thread portion from the upper side of the lower piece so as to be mounted", and the like can be exemplified.

In addition, the "side surface of the plate-like module" includes a common side surface of the plate-like module and an end surface projecting from the common side surface. Further, the "state where the side surface of the plate-like module is made to be close to the shaft portion" indicates a state where the side surface of the plate-like module is located at a position closer to the shaft portion relative to a center between a front end of the upper piece and the shaft portion, and desirably, a state where the side surface of the plate-like module is located at a position closer to the shaft portion so as not to be distanced therefrom by even ¼ of a distance between the front end of the upper piece and the shaft portion. With this, the plate-like module can be held and secured between the upper piece and the abutment portion of the lower piece sufficiently.

Further, as the expression "the lower piece is mounted on the mounting target so that the upper piece is lowered", a case where "a bottom surface of the lower piece is curved or bent so as to make a portion just under the shaft portion be into a state of being separated from the upper surface of the mounting target and the lower piece is mounted on the mounting target so as to deform the lower piece so that the upper piece is lowered", a case where "only the front end of the lower piece at a side opposite to the mounting hole is made to abut against the mounting target and the lower piece is mounted such that the bottom surface of the lower piece is entirely made along the mounting target so that the upper piece is lowered", a case where "protrusions protruding downward are provided in the vicinity of both ends of a bottom surface of the lower piece so as to make a portion just under the shaft portion be into a state of being separated from the upper surface of the mounting target and the lower piece is mounted on the mounting target so as to deform the lower piece so that the upper piece is lowered", and the like can be exemplified.

With this, in a state where the plate-like module is inserted into between the upper piece and the lower piece at one side of both sides with respect to the shaft portion on the securing member, which is the side opposite to the mounting hole, and the side surface of the plate-like module is made to abut against or made close to the shaft portion, the securing member is placed on the mounting target such as the roof tile. Then, the lower piece is mounted on the mounting target with the screw, the bolt, the nut, or the like through the mounting hole formed on the lower piece. With this, the upper piece is lowered together with the shaft portion and the plate-like module can be secured by being sandwiched between the upper piece and the abutment portion of the lower piece in the up-down direction. Therefore, the plate-like module can be prevented from rattling or sliding in the direction in which the securing member extends. This makes it possible to secure the plate-like module reliably.

Moreover, the lower piece extends so as to be larger than the upper piece. Therefore, in a state where the securing member is mounted on the mounting target, the plate-like module is inserted and pressed into between the upper piece and the lower piece at the side of the mounting hole in an inclined manner so that the plate-like module can be also secured by being sandwiched at the side of the mounting hole. Accordingly, with the securing member, the plate-like modules can be secured at both sides of the shaft portion. Therefore, a plurality of plate-like modules can be secured sequentially from one side to the other side of the mounting target. This makes it possible to simplify time and effort relating to installation of the plate-like modules and reduce cost relating to the installation.

Further, as described above, the plate-like module can be secured by being sandwiched between the upper piece and the abutment portion of the lower piece of the securing member. Therefore, even when the plate-like module is installed in an inclined state, the load of the plate-like module can be supported by the securing members which secure both of the upper and lower sides of the plate-like module. Therefore, the load is suppressed from being biased to one securing member only so that deformation and breakage of the securing member due to uneven loading can be prevented from occurring.

In addition, the plate-like module is be secured by being sandwiched between the upper piece and the abutment portion of the lower piece of the securing member. Therefore, even if the engaging portion for being engaged with the securing member is not provided on the solar cell module unlike the frame body of the solar cell module as described in Patent Document 1, the plate-like module can be secured reliably with the securing members as long as the plate-like module can be sandwiched thereby. Accordingly, the securing member having high versatility can be obtained. A special plate-like module is not required to be used and a general (commercially available) plate-like module can be used, thereby reducing cost relating to the entire system with the plate-like module.

Meanwhile, in Patent Document 1, the engaging portion on the frame body of the solar cell module and the claw-like to-be engaged portion on the securing member are engaged with each other so as to restrict the frame body of the solar cell module from moving in the direction of being farther from the shaft direction (direction of the eaves side). In this case, the engagement is required to be strengthened depending on a weight of the solar cell module. If the engagement is strengthened, the securing member becomes difficult to be inserted and fitted into the side surface of the frame body from the perpendicular direction. This arises a risk that operability becomes worse. However, with the securing member according to the aspect of the invention, since the claw-like to-be engaged portion as described in Patent Document 1 is not provided, the securing member can be inserted and fitted into the side surface of the plate-like module from the perpendicular direction simply. Therefore, the operability can be made preferable.

It is to be noted that the securing member is desirably formed such that the mounting hole is located at a position closer to the shaft portion as much as possible. This makes it possible to increase the securing strength of the plate-like module with the upper piece when the lower piece is mounted on the mounting target with the screw, the bolt, the nut, or the like through the mounting hole. Eventually, the plate-like module can be secured more reliably. Further, a recessed portion which can accommodate a head portion of the screw or the bolt, the nut, or the like for mounting the securing member on the mounting target through the mounting hole may be formed on the upper surface of the lower piece. With this, the head portion of the bolt or the like can be avoided from abutting against the plate-like module, thereby making the mounting hole be closer to the shaft portion as much as possible.

In the securing member according to the aspect of the invention, a configuration in which "a bottom surface of the lower piece is curved or bent such that a portion just under the shaft portion is the highest in a state before the securing member is mounted on the mounting target, and if the securing member is mounted, the bottom surface is deformed to be made into a state of being along the mounting target" maybe employed in addition to the above-mentioned configuration.

With this configuration, the bottom surface of the lower piece on the securing member is curved or bent such that the portion just under the shaft portion is the highest. A space is formed just under the shaft portion in a state where the securing member is placed on the mounting target (state before mounted). If the securing member is mounted on the mounting target through the mounting hole in this state, the lower piece is deformed so that the bottom surface is made into a state of being along the mounting target and the space on the portion just under the shaft portion disappears. Therefore, the upper piece is lowered through the shaft portion by an amount of the space. Accordingly, the securing member of which upper piece is lowered if the lower piece is mounted on the mounting target can be realized reliably. This makes it possible to obtain the securing member with the above-mentioned action effects.

It is to be noted that the thickness of the lower piece in the up-down direction may be increased in the direction of being farther from the shaft portion and the thickened front ends may be formed as the abutment portions. With this, if the securing member is mounted on the mounting target, the center of the lower piece (at a position of the shaft portion) is lowered and the front ends (abutment portions) of the lower piece are heightened relatively. Therefore, the plate-like module can be sandwiched between the upper piece and the abutment portion more strongly, thereby securing the plate-like module reliably.

The securing member according to the aspect of the invention may be configured such that "the securing member further includes through-holes that are formed on the lower piece at both sides with respect to the shaft portion and penetrate through the lower piece in the up-down direction, and an auxiliary securing portion that has striking portions which are inserted into the through-holes from the lower sides and which have upper ends each of which strikes the lower surface of the plate-like module if the lower piece is mounted on the mounting target through the mounting hole" in addition to the above-mentioned configuration.

As the "auxiliary securing portion", an "auxiliary securing portion of which striking portions to be inserted into the through-holes formed on the lower piece at both sides with respect to the shaft portion are coupled integrally at the lower side of the lower piece", an "auxiliary securing portion of which striking portions to be inserted into the through-holes formed on the lower piece at both sides with respect to the shaft portion are individual", an "auxiliary securing portion of which striking portions to be inserted into the through-holes formed on the lower piece at both sides with respect to the shaft portion are coupled integrally at the lower side of the lower piece and which has an elastic portion biasing the bottom surface of the lower piece in the direction of being farther from the mounting target", and the like can be exemplified.

With this, if the securing member is mounted on the mounting target, each of the striking portions of the auxiliary securing portion, which has been inserted into each of the through-holes, strikes the lower surface of the plate-like module. Therefore, the plate-like module can be also prevented from rattling or sliding in the direction in which the securing member extends with the auxiliary securing portion. This makes it possible to secure the plate-like module reliably.

It is to be noted that the auxiliary securing portion may be formed such that the striking portions to be inserted into the through-holes at both sides of the shaft portion are coupled integrally at the lower side of the lower piece and have electrical conductivity. With this, the plate-like modules which are secured at both sides of the shaft portion can be electrically connected to each other through the auxiliary securing portion. Therefore, the plate-like modules can be ground-connected easily. In addition, even when plate-like modules having electrical insulating films on surfaces thereof are used, the striking portions of the auxiliary securing portion strike the surface so as to break the films. Therefore, the plate-like modules such as the solar cell modules can be electrically connected to each other and ground-connected reliably.

As described above, a securing member which can secure a plate-like module such as a solar cell module reliably and has high versatility can be provided.

DESCRIPTION OF THE PREFERRED EMBODIMENTS

A securing member according to an embodiment of the invention is described in detail with reference to FIG. 1 through FIGS. 3A to 3C.

Figure 1:
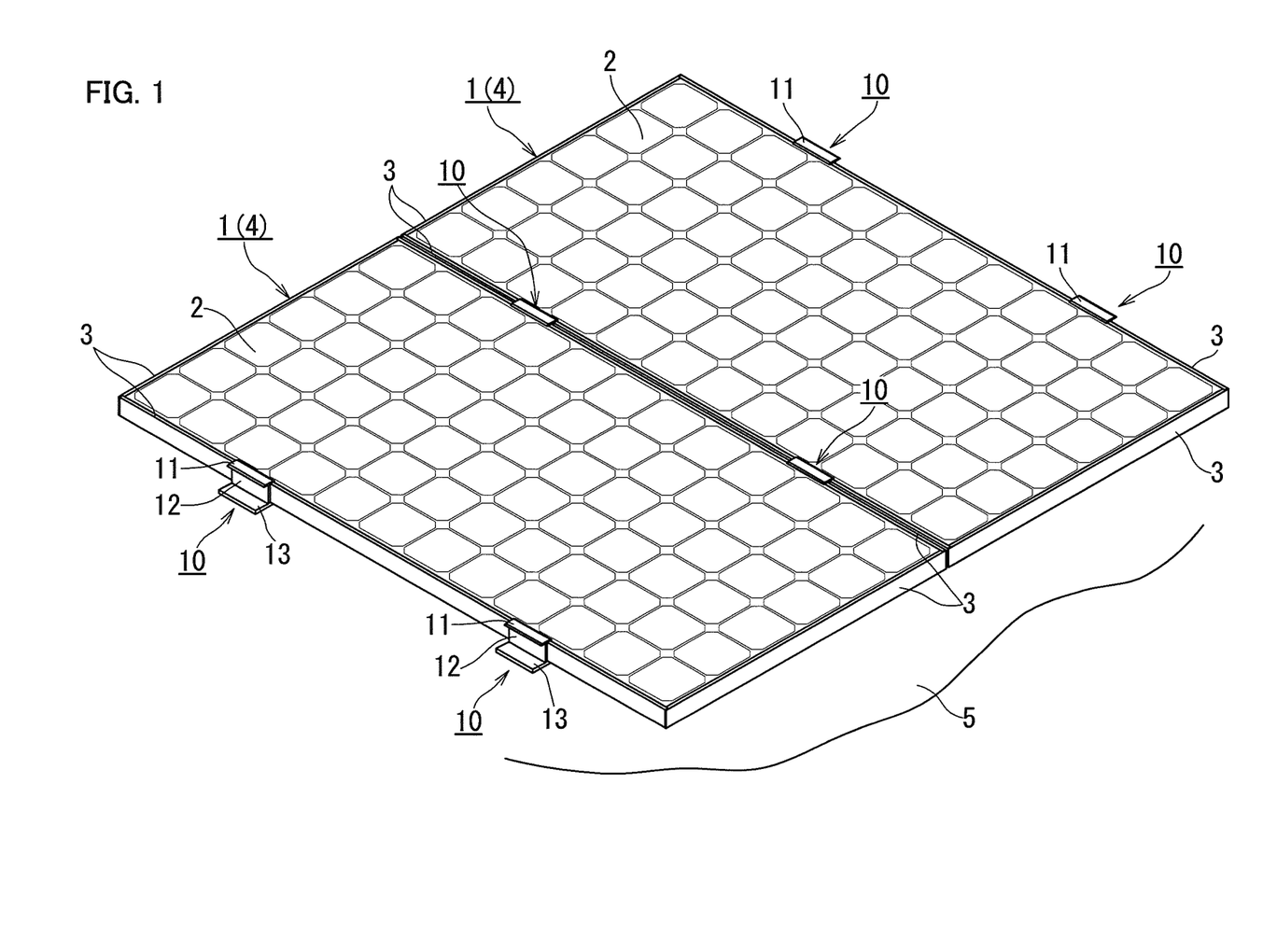
FIG. 1 is a perspective view illustrating a state where plate-like modules are secured to a mounting target by using securing members according to one embodiment of the invention.
Figure 2:
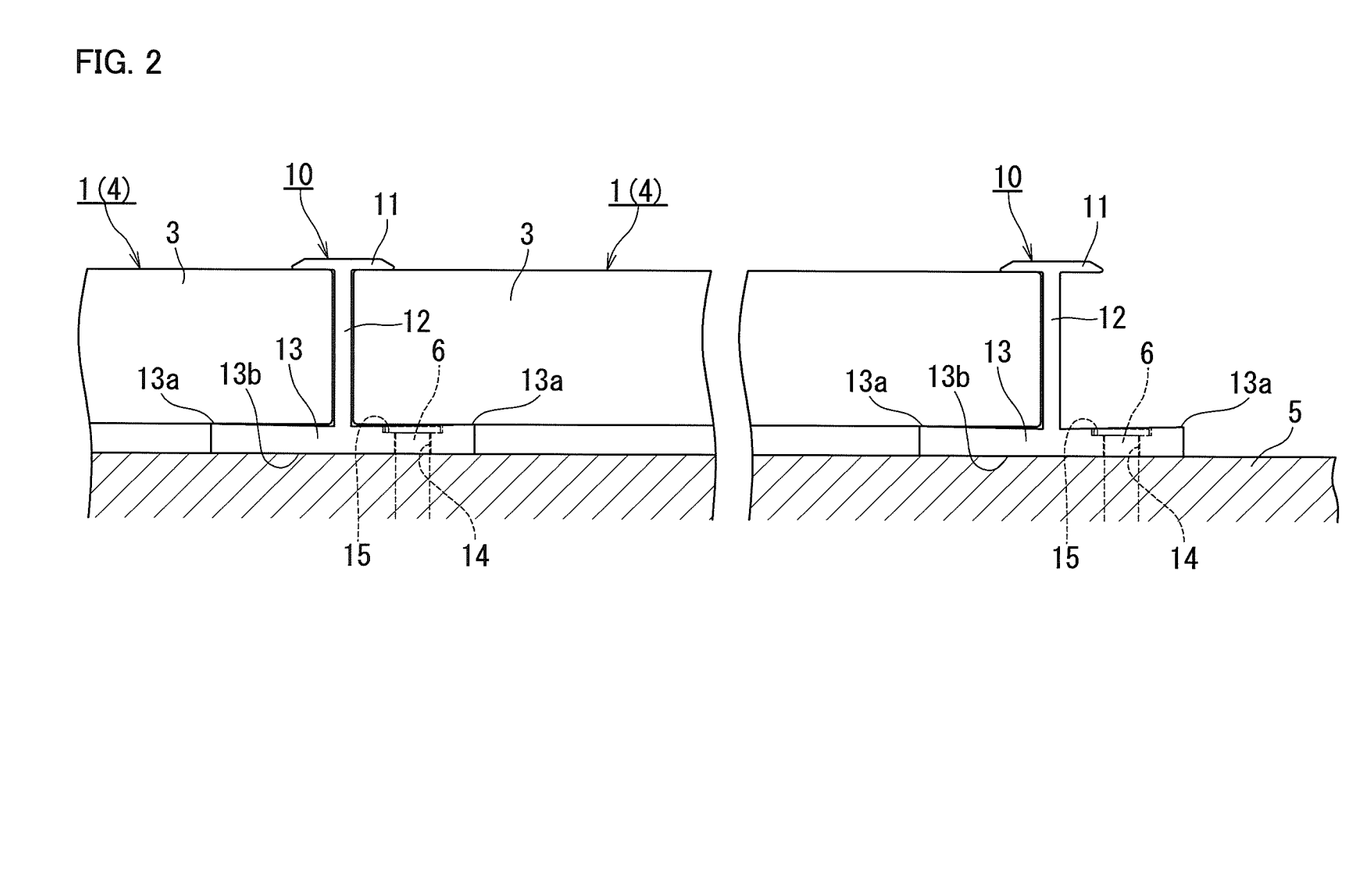
FIG. 2 is a side view illustrating a main part of FIG. 1.

As illustrated in FIG. 1 and the like, a securing member 10 according to the embodiment is a member for installing a plate-like module 1 such as a solar cell module 4 on amounting target 5 such as a roof tile. The plate-like module 1 such as the solar cell module 4 is obtained by surrounding an outer circumference of a plate-like solar cell panel 2 by a frame body 3. The securing member 10 is mounted on the mounting target 5 by a predetermined fastener member 6 such as a screw and a bolt. The securing member 10 in the embodiment includes an upper piece 11, a shaft portion 12, a lower piece 13, and a mounting hole 14. The upper piece 11 can abut against an upper surface of the plate-like module 1 and extends in the right-left direction. The shaft portion 12 extends downward from a center of the upper piece 11. The lower piece 13 extends to both sides from the lower end of the shaft portion 12 so as to be larger than the upper piece 11. The mounting hole 14 is formed at one side of both sides with respect to the shaft portion 12 on the lower piece 13 and penetrates through the lower piece 13 in the up-down direction. On the securing member 10, each of the upper piece 11 and the lower piece 13 extends to the left and right sides from the shaft portion 12 substantially equally. When seen from the lengthwise direction, the securing member 10 is formed into an H shape of which upper side is shorter.

Figure 3A:
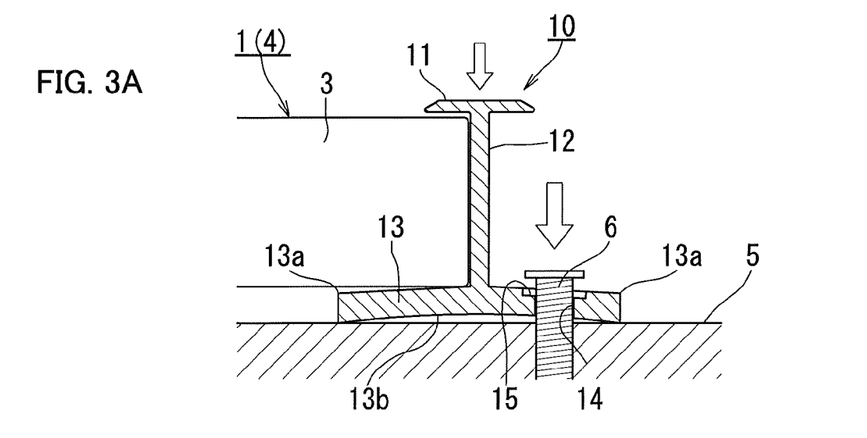
FIG. 3A is a descriptive view illustrating a state before the securing member of FIG. 1 is mounted on the mounting target.

Further, the securing member 10 includes a recessed portion 15 on an upper rim of the mounting hole 14 on the lower piece 13. A head portion of the fastener member 6 to be screwed into the mounting target 5 through the mounting hole 14 can be accommodated in the recessed portion 15. The securing member 10 is formed such that the thickness of the lower piece 13 in the up-down direction is increased as is farther from the shaft portion 12. Upper portions of front ends of the lower piece 13, which are farther from the shaft portion 12, are formed as abutment portions 13a each of which abuts against the lower surface of the plate-like module 1. Further, as illustrated in FIG. 3A, the securing member 10 is in a state where a bottom surface 13b of the lower piece 13 is curved such that a portion just under the shaft portion 12 is the highest in a state before the securing member 10 is mounted on the mounting target 5. It is to be noted that in the state before the securing member 10 is mounted on the mounting target 5, the upper surface of the lower piece 13 is lower toward the front ends and the plate-like module 1 is easy to be inserted into between the upper piece 11 and the lower piece 13.

The securing member 10 in the embodiment is formed as an extrusion mold member by using a metal such as aluminum alloy. The securing member 10 is formed by cutting the long extrusion mold member having an even cross-sectional shape into an appropriate length (in the embodiment, 100 mm to 200 mm) and forming one to three of the mounting hole 14 with the recessed portion 15 in the lengthwise direction. Note that the plate-like module 1 is a commercially available product and a length of a long side of the plate-like module 1 to be secured by the securing member 10 is 900 mm to 2000 mm.

Next, a method of securing the plate-like module 1 by using the securing members 10 according to the embodiment is described. At first, the securing member 10 is placed along a mark-off line drawn on a predetermined position on the mounting target 5, for example, and the fastener member 6 such as a screw and a bolt is inserted into the mounting hole 14. Then, the fastener member 6 is screwed into the mounting target 5 until the bottom surface 13b of the lower piece 13 on the securing member 10 is identical to the upper surface of the mounting target 5. Thereafter, one side surface of the plate-like module 1 is inserted into between the upper piece 11 and the lower piece 13 of the mounted securing member 10 and another securing member 10 is inserted into the other opposed side surface of the plate-like module 1. To be more specific, the securing member 10 is inserted such that the other side surface of the plate-like module 1 is positioned between the upper piece 11 and the lower piece 13 at the side of both sides with respect to the shaft portion 12 on the securing member 10, which is opposite to the side at which the mounting hole 14 is formed, and the securing member 10 is placed on the mounting target 5 (see, FIG. 3A).

In this state, the bottom surface 13b of the securing member 10 is curved. Further, in the state, both ends of the lower piece 13 abut against the upper surface of the mounting target 5 and a space is formed between the bottom surface 13b and the upper surface of the mounting target 5. The space is the largest at a position just under the shaft portion 12. Then, the fastener member 6 is inserted into the mounting hole 14 from the upper side of the securing member 10 and the fastener member 6 is screwed into the mounting target 5 so that the head portion of the fastener member 6 is lowered to enter the recessed portion 15. If the head portion abuts against a bottom of the recessed portion 15, the lower piece 13 of which bottom surface 13b is curved is pressed downward with the head portion of the fastener member 6. With this, the curved bottom surface 13b of the lower piece 13 is deformed, and the shaft portion 12 and the upper piece 11 are lowered through the lower piece 13 together with the lowering of the fastener member 6 (head portion).

Then, if the portion just under the shaft portion 12 on the bottom surface 13b of the lower piece 13 abuts against the upper surface of the mounting target 5, the curved bottom surface 13b is made into a shape along the upper surface of the mounting target 5 (in this example, cross section is linear) and the lowering of the shaft portion 12 and the upper piece 11 through the lower piece 13 is stopped. At this time, the upper piece 11 is lowered to abut against the upper surface of the plate-like module 1. Further, the center of the lower piece 13, which is located just under the shaft portion 12, is lowered so that the abutment portions 13a on the front ends of the lower piece 13 are heightened relatively. Therefore, the abutment portion 13a at one side abuts against the lower surface of the plate-like module 1. With this, the plate-like module 1 is made into a state of being sandwiched between the upper piece 11 and the abutment portions 13a of the lower piece 13 in the up-down direction. This realizes a state where the other side surface of the plate-like module 1 is secured (see, FIG. 3B).

Figure 3B:
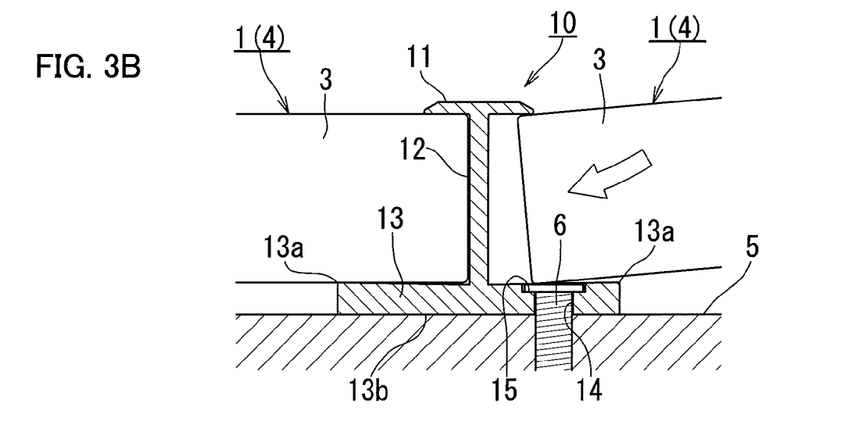
FIG. 3B is a descriptive view illustrating a state where the securing member is mounted on the mounting target to secure one plate-like module.
Figure 3C:
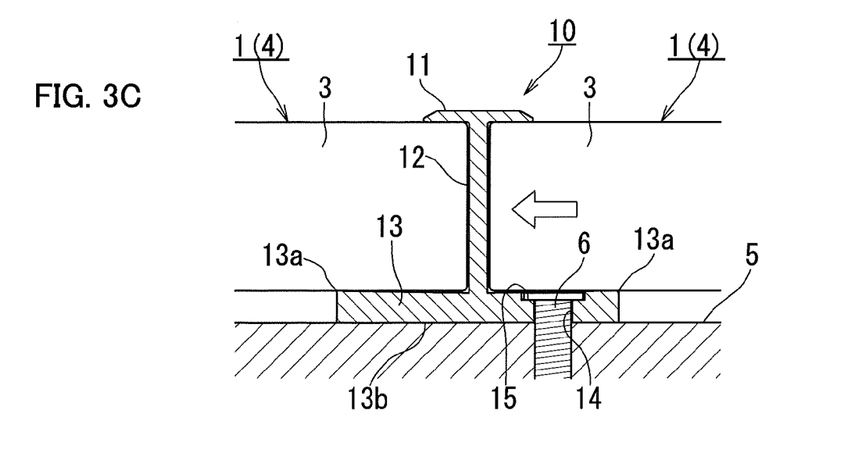
FIG. 3C is a descriptive view illustrating a state where the plate-like modules are secured at both sides of a shaft portion of the securing member.

Subsequently, one side surface of another plate-like module 1 is inserted into between the lower piece 13 and the upper piece 11 at the side of the mounting hole 14 on the securing member 10 to which the first plate-like module 1 has been secured at the side opposite to the mounting hole 14. At this time, as illustrated in FIG. 3B, in a state where the plate-like module 1 is inclined obliquely with respect to the upper surface of the mounting target 5, the side surface is inserted so as to slide along the upper surface of the lower piece 13. Thereafter, the plate-like module 1 is positioned such that the upper surface thereof is substantially the same plane as the upper surface of the plate-like module 1 which has been secured before. This makes it possible to insert the plate-like module 1 into between the lowered upper piece 11 and the lower piece 13 with a small force.

Then, if one side surface of the plate-like module 1 has been secured (supported) by the securing member 10, another securing member 10 is inserted into the other side surface of the plate-like module 1 so as to mount the securing member 10 on the mounting target 5 in the same manner as described above. With this, the second plate-like module 1 can be secured. This makes it possible to secure a plurality of plate-like modules 1 from one side to the other side of the mounting target sequentially.

As described above, with the securing member 10 according to the embodiment, if the lower piece 13 is mounted on the mounting target 5 with the fastener member 6 such as the screw or the bolt through the mounting hole 14 formed on the lower piece 13, the upper piece 11 is lowered together with the shaft portion 12 and the plate-like module 1 can be secured by being sandwiched between the upper piece 11 and the abutment portion 13a of the lower piece 13 in the up-down direction. Therefore, the plate-like module 1 can be also prevented from rattling or sliding in the direction in which the securing member 10 extends. This makes it possible to secure the plate-like module 1 reliably.

In addition, the lower piece 13 extends so as to be larger than the upper piece 11. In a state where the securing member 10 is mounted on the mounting target 5, the plate-like module 1 is inserted and pressed into between the upper piece 11 and the lower piece 13 at the side of the mounting hole 14 in an inclined manner so that the plate-like module 1 can be also secured by being sandwiched at the side of the mounting hole 14. Accordingly, with the securing member, the plate-like modules 1 can be secured at both sides with respect to the shaft portion 12. Therefore, a plurality of plate-like modules 1 can be secured sequentially from one side to the other side of the mounting target. This makes it possible to simplify time and effort relating to installation of the plate-like modules 1 and reduce cost relating to the installation.

Further, the plate-like module 1 can be secured by being sandwiched between the upper piece 11 and the abutment portion 13a of the lower piece 13 of the securing member 10. Therefore, even when the plate-like module 1 is installed in an inclined state, for example, on inclined roof or the like, both of the upper and lower sides of the plate-like module 1 can be supported by the securing member 10. Accordingly, the load is suppressed from being biased to one securing member (at the lower side) only so that deformation and breakage of the securing member 10 due to the uneven loading can be prevented from occurring.

As described above, the invention has been described by using a preferable embodiment. However, the invention is not limited to the embodiment and various improvements and changes in design can be made in a range without departing from a scope of the invention as will be described below.

Figure 4A:
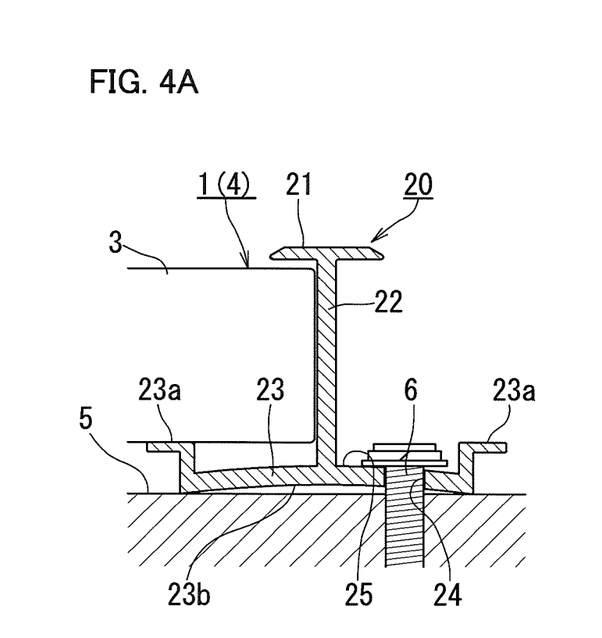
FIG. 4A is a cross-sectional view illustrating a securing member according to another embodiment in a state before the securing member is mounted on the mounting target.
Figure 4B:
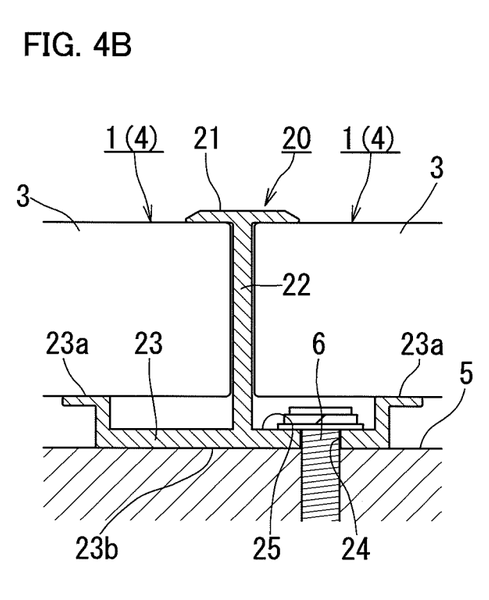
FIG. 4B is a cross-sectional view illustrating the securing member of FIG. 4A in a state where the securing member is mounted on the mounting target.

That is to say, in the above-mentioned embodiment, the securing member 10 having the lower piece 13 of which thickness in the up-down direction is increased as is farther from the shaft portion 12 has been described. However, the invention is not limited thereto and a securing member 20 as illustrated in FIGS. 4A and 4B may be employed. It is to be noted that basic configurations thereof are denoted with the technical terms same as those in the above-mentioned embodiment and detail description thereof is omitted. The securing member 20 includes an upper piece 21 and a shaft portion 22 which are formed into forms same as those in the above-mentioned embodiment and includes a lower piece 23 which is formed into a different form from that in the above-mentioned embodiment. To be more specific, the lower piece 23 extends from the shaft portion 22 in the right-left direction so as to be larger than the upper piece 21 while having a constant thickness. Further, front ends of the lower piece 23 extend upward by a predetermined amount once and extend outward (in the direction of being farther from the shaft portion 22) from upper ends thereof so as to be in substantially parallel with the upper surface of the mounting target 5. The extended upper surfaces correspond to abutment portions 23a.

It is to be noted that a mounting hole 24 which penetrates through the lower piece 23 in the up-down direction is formed between the shaft portion 22 and the abutment portion 23a at one side (right side in FIG. 4A) of both sides with respect to the shaft portion 22 on the lower piece 23. A portion from the abutment portion 23a to the shaft portion 22 on lower piece 23 at the side of the upper surface is recessed in comparison with the abutment portion 23a. Therefore, the corresponding portion of lower piece 23 serves as a recessed portion 25 which can accommodate a head portion or the like of the fastener member 6. Also on the securing member 20, a bottom surface 23b of the lower piece 23 is curved such that a portion just under the shaft portion 22 is the highest in a state before the securing member 20 is mounted on the mounting target 5. Accordingly, the same action effects as those obtained by the above-mentioned securing member 10 can be obtained.

Figure 5A:
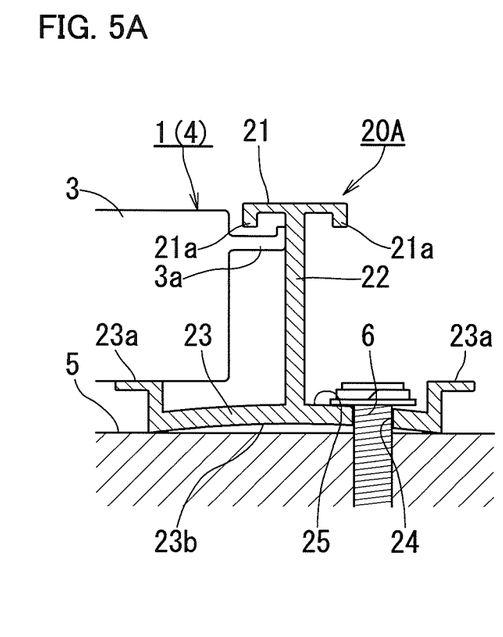
FIG. 5A is a cross-sectional view illustrating a securing member according to still another embodiment in a state before the securing member is mounted on the mounting target.
Figure 5B:
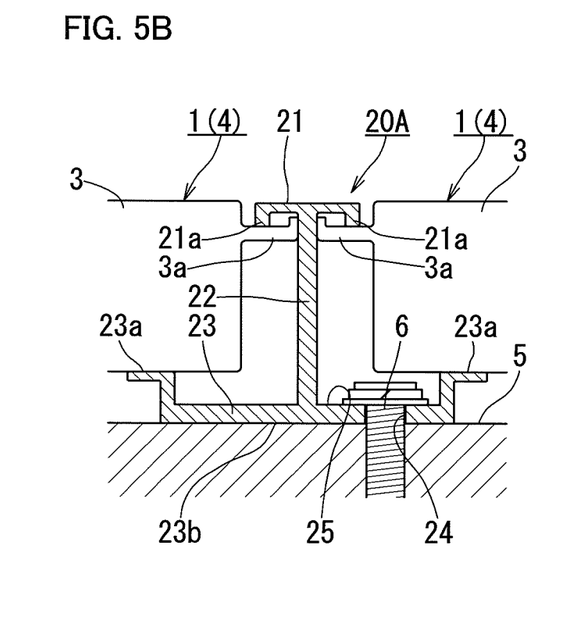
FIG. 5B is a cross-sectional view illustrating the securing member of FIG. 5A in a state where the securing member is mounted on the mounting target.

Further, in the above-mentioned embodiment, the securing members 10 and 20 which respond to the plate-like module 1 having flat side surfaces have been described. However, the invention is not limited thereto. For example, as illustrated in FIGS. 5A and 5B, a securing member 20A which responds to the plate-like module 1 having flange portions 3a for fixing which extend outward from side surfaces thereof may be employed. As illustrated in FIGS. 5A and 5B, the securing member 20A is formed such that the upper piece 21 on the securing member 20 as illustrated in FIGS. 4A and 4B includes projecting portions 21a on both of right and left ends. Each projecting portion 21a projects downward and can abut against the upper surface of the flange portion 3a of the plate-like module 1. With the securing member 20A, the securing member 20A can also respond to the plate-like module 1 including the flange portions 3a on the side surfaces, and the same action effects as those obtained by the above-mentioned securing member can be obtained. Further, each projecting portion 21a may strike the upper surface of the flange portion 3a. In this case, the plate-like modules 1 arranged at both sides of the shaft portion 22 can be electrically connected to each other with the securing member 20A.

Figure 6A:
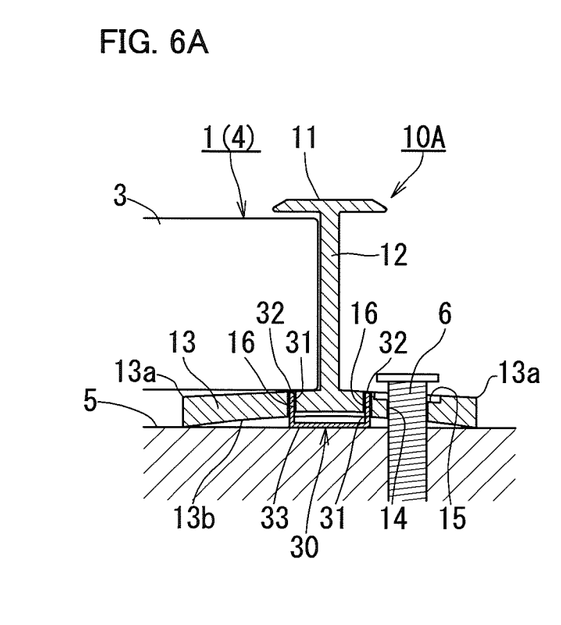
FIG. 6A is a cross-sectional view illustrating a securing member according to still another embodiment in a state before the securing member is mounted on the mounting target.
Figure 6B:
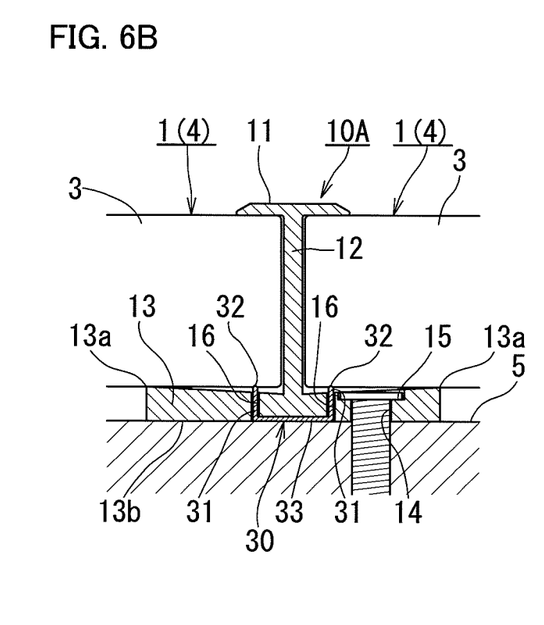
FIG. 6B is a cross-sectional view illustrating the securing member of FIG. 6A in a state where the securing member is mounted on the mounting target.
Figure 7A:
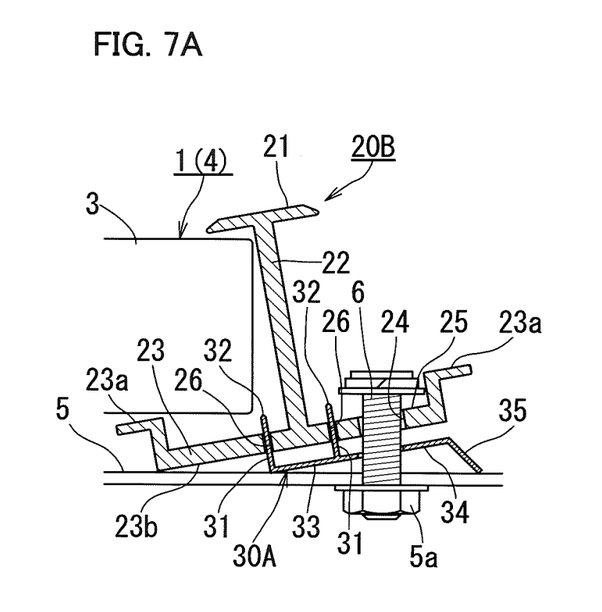
FIG. 7A is a cross-sectional view illustrating a securing member according to still another embodiment in a state before the securing member is mounted on the mounting target.

In addition, in the above-mentioned embodiment, a configuration in which the plate-like module 1 is sandwiched between the upper piece 11 or 21 and the abutment portion 13a or 23a of the lower piece 13 or 23 of the securing member 10, 20 or 20A only has been described. However, the invention is not limited thereto and an auxiliary securing portion 30 or 30A which supports securing of the plate-like module 1 as illustrated in FIGS. 6A and 6B or FIGS. 7A and 6B may be further included. At first, a securing member 10A as illustrated in FIGS. 6A and 6B includes through-holes 16 and an auxiliary securing portion 30 in addition to the configuration of the above-mentioned securing member 10. The through-holes 16 are provided at both sides of the shaft portion 12 on the lower piece 13 and penetrate through the lower piece 13 in the up-down direction. The auxiliary securing portion 30 includes a pair of insertion pieces 31 and striking portions 32 which are inserted into the respective through-holes 16 from the lower side. The striking portions 32 are formed on upper ends of the respective insertion pieces 31 and front ends of the striking portions 32 are sharpened. On the auxiliary securing portion 30 in the embodiment, lower ends of the pair of insertion pieces 31 are coupled to each other with a coupling piece 33. The auxiliary securing portion 30 in the embodiment is formed to have a U-shaped cross section. Further, the auxiliary securing portion 30 is formed by bending a metal plate material such as a stainless steel. Although details thereof are not illustrated, the striking portions 32 which are sharpened upward are formed on both ends of the upper end of the auxiliary securing portion 30 in the lengthwise direction.

According to the embodiment, if the fastener member 6 is screwed through the mounting hole 14 such that the curved bottom surface 13b of the lower piece 13 on the securing member 10A is substantially identical to the upper surface of the mounting target 5 so as to mount the securing member 10A on the mounting target 5, the striking portions 32 of the auxiliary securing portion 30 which have been inserted into the through-holes 16 project upward from the upper surface of the lower piece 13 relatively and strike the lower surfaces of the plate-like modules 1 (see, FIG. 6B). With this, in addition to the configuration in which the plate-like module 1 is held between the upper piece 11 and the abutment portion 13a of the lower piece 13, each striking portion 32 of the auxiliary securing portion 30 strikes the lower surface of the plate-like module 1. Therefore, the plate-like module 1 can be also prevented from rattling or sliding in the direction in which the securing member 10A extends and in the direction of being farther from the shaft portion 12 with the auxiliary securing portion 30. This makes it possible to secure the plate-like module 1 reliably. Moreover, the auxiliary securing member 30 is formed by a metal plate material having electrical conductivity. Therefore, the plate-like modules 1 arranged at both sides of the shaft portion 12 on the securing member 10A can be electrically connected to each other with the auxiliary securing portion 30. Therefore, the plate-like modules 1 can be ground-connected easily.

Figure 7B:
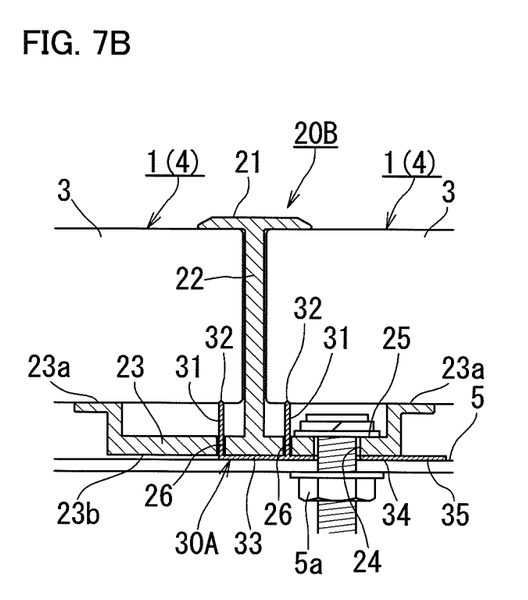
FIG. 7B is a cross-sectional view illustrating the securing member of FIG. 7A in a state where the securing member is mounted on the mounting target.

On the other hand, a securing member 20B as illustrated in FIGS. 7A and 7B includes through-holes 26 which penetrate through the lower piece 23 in the up-down direction at both sides of the shaft portion 22 on the lower piece 23 in a state where the bottom surface 23b of the lower piece 23 is flattened even in a state before the securing member 20B is mounted on the mounting target 5 unlike the configuration of the above-mentioned securing member 20 as illustrated in FIGS. 4A and 4B. In addition, the securing member 20B includes an auxiliary securing portion 30A having the insertion pieces 31 and the striking portions 32 to be inserted into the respective through-holes 26 from the lower side. The auxiliary securing portion 30A in the embodiment further includes an extending piece 34 and an elastic piece 35 as illustrated in FIG. 7A. The extending piece 34 extends from a lower end of the insertion piece 31 to be inserted into the through-hole 26 at the side of the mounting hole 24 in the direction of being farther from the shaft portion 22 on the same plane with the coupling piece 33. The elastic piece 35 is bent downward obliquely from a front end of the extending piece 34.

As illustrated in FIG. 7A, the securing member 20B in the embodiment has the following configuration. That is, in a state before the securing member 20B is mounted on the mounting target 5, a front end of the bottom surface 23b of the lower piece 23 at the side opposite to the mounting hole 24 (elastic piece 35) abuts against the upper surface of the mounting target 5 only with the elastic piece 35 of the auxiliary securing portion 30A arranged at the lower side of the lower piece 23 so that the front end thereof at the side of the mounting hole 24 is made into a state of being separated from the upper surface of the mounting target 5. In this state, the plate-like module 1 is inserted into between the upper piece 21 and the lower piece 23 at the side opposite to the mounting hole 24 and the fastener member 6 is screwed through the mounting hole 24. With this, the bent elastic piece 35 is developed to be the same plane as the extending piece 34 and the striking portion 32 on the upper end of each insertion piece 31 strikes the lower surface of the plate-like module 1 (see, FIG. 7B), thereby obtaining the same action effects as those obtained by the above-mentioned securing member.

Figure 8A:
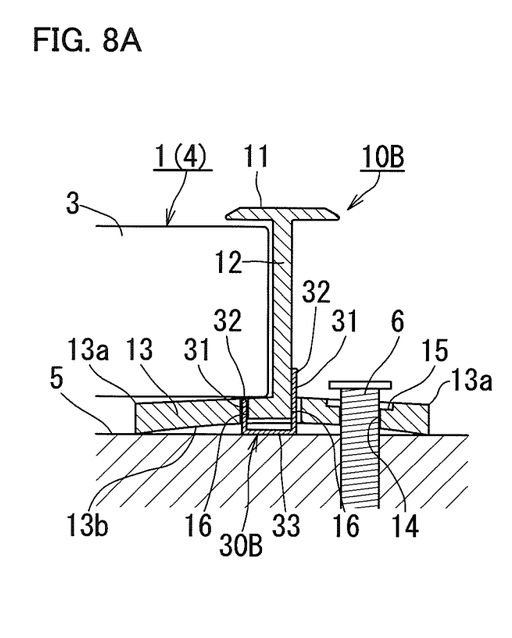
FIG. 8A is a cross-sectional view illustrating a securing member according to still another embodiment in a state before the securing member is mounted on the mounting target.
Figure 8B:
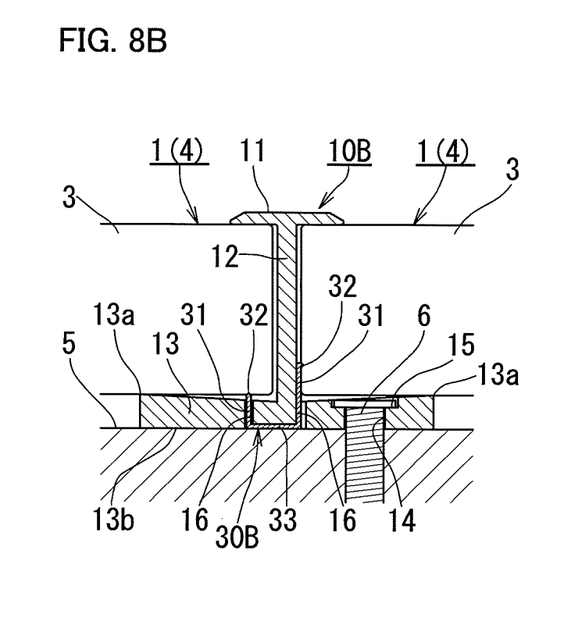
FIG. 8B is a cross-sectional view illustrating the securing member of FIG. 8A in a state where the securing member is mounted on the mounting target.

In addition, in the embodiments as illustrated in FIGS. 6A and 6B and FIGS. 7A and 7B, the striking portions 32 of the auxiliary securing portion 30 or 30A at both sides strike the lower surfaces of the plate-like modules 1. However, the invention is not limited thereto. For example, as illustrated in FIGS. 8A and 8B, the striking portion 32 at the side of the mounting hole 14 may strike the side surface of the plate-like module 1. A securing member 10B has the following configuration unlike the securing member 10A as illustrated in FIGS. 6A and 6B. That is, the through-hole 16 at the side of the mounting hole 14 is formed at a base position of the shaft portion 12. Further, the insertion piece 31 of the auxiliary securing portion 30B at the side of the mounting hole 14, which is to be inserted into the through-hole 16, extends upward along the shaft portion 12 largely and the striking portion 32 is formed so as to be sharpened from the upper end of the insertion piece 31 in the right-left direction (right direction in FIG. 8A).

With the securing member 10B in the embodiment, the following action effect can be obtained in addition to the same action effects as those obtained by the above-mentioned securing member. That is, when the plate-like module 1 is inserted into between the upper piece 11 and the lower piece 13 at the side of the mounting hole 14, the insertion piece 31 and the striking portion 32 which project upward from the through-hole 16 of the lower piece 13 can be avoided from getting in the way. This makes it possible to cause the plate-like module 1 to be inserted easily.

Figure 9:
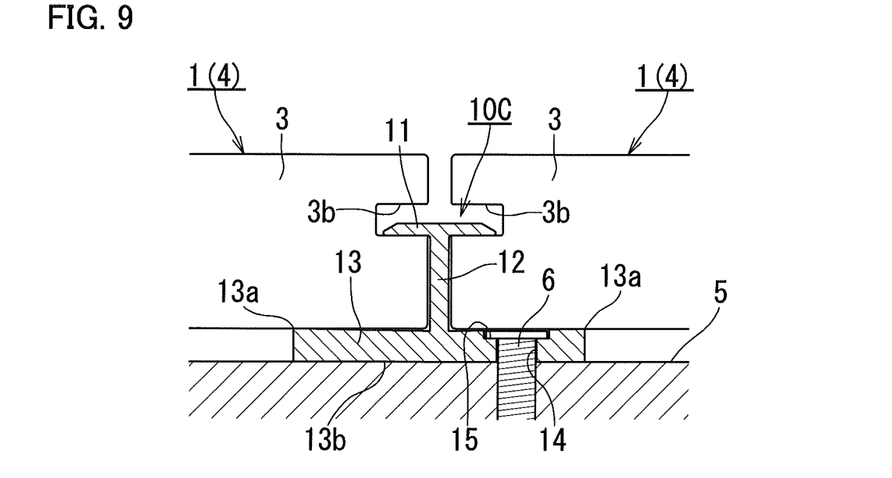
FIG. 9 is a cross-sectional view illustrating a securing member according to still another embodiment in a state where the securing member is mounted on the mounting target.

Further, in the embodiments as described above, the upper piece 11 or 21 of the securing member 10 or 20 abuts against the upper surface of the plate-like module 1. However, the invention is not limited thereto. For example, as illustrated in FIG. 9, the following configuration may be employed. That is, the upper piece 11 of the securing member 10C is inserted into grooves 3b on side surfaces of the plate-like modules 1 on which the grooves 3b are formed on the side surfaces and the upper piece 11 is made to abut against surfaces in the grooves 3b so as to sandwich the plate-like modules 1 together with the abutment portions 13a of the lower piece 13. With this configuration, the same action effects as those obtained by the above-mentioned securing member can be also obtained. In addition, the upper piece 11 is not exposed to the upper surfaces of the plate-like modules 1. This makes it possible to make the plate-like modules 1 at the side of the upper surfaces look nice.

Further, in the embodiments as described above, the fastener member 6 which has a head portion and is screwed into the mounting target 5 from the mounting hole 14 or 24 from the upper side of the lower piece 13 or 23, such as the screw and the bolt, is used. However, the fastener member 6 is not limited thereto, and a nut may be used, for example. When the nut is used, an external thread portion is made to project from the side of the mounting target 5 so as to be inserted through the mounting hole 14 or 24, and the nut is screwed with the external thread portion from the upper side of the lower piece 13 or 23. With the nut, the same action effects as those obtained in the above-mentioned embodiment can be also obtained.

In addition, in the embodiments as illustrated in FIG. 1 through FIGS. 6A and 6B, FIGS. 8A and 8B, and FIG. 9, on the mounting target 5 on which the securing member 10 or 20 is mounted, a portion into which the fastener member 6 is screwed is a thread hole or a screw hole. However, the portion is not limited thereto. For example, as illustrated in FIGS. 7A and 7B, a nut 5a may be used. With the nut 5a, the same action effects as those obtained in the above-mentioned embodiments can be also obtained. It is to be noted that when the fastener member 6 is screwed into the nut 5a of the mounting target 5, the nut 5a may be made to slide in the direction (right-left direction in FIG. 7A) perpendicular to the shaft portion 12 or 22. This makes it possible to adjust a mounting position of the securing member 10 or 20, thereby enhancing operability relating to the installation of the plate-like module 1.

What is claimed is:

1. A securing member comprising:
    an upper piece that is capable of abutting against upper surfaces of two adjacent plate-like modules and extends in a right-left direction;
    a shaft portion having a single wall and integrally formed with the upper piece that extends downward from a center of the upper piece, both sides of the single wall abutting side surfaces of the adjacent plate-like modules;
    a lower piece integrally formed with the shaft portion that extends to both sides from a lower end of the shaft portion so as to be larger than the upper piece and has abutment portions which are capable of abutting against lower surfaces of the adjacent plate-like modules on upper portions of the lower piece; and
    a mounting hole that is formed on the lower piece at one side of both sides with respect to the shaft portion and penetrates through the lower piece in an up-down direction,
    wherein the lower piece is mounted on a mounting target of the adjacent plate-like modules through the mounting hole in a state where the side surfaces of the adjacent plate-like modules are made to abut against the shaft portion so that the upper piece is lowered to abut against the upper surfaces of the adjacent plate-like modules and the abutment portions of the lower piece abut against the lower surfaces of the adjacent plate-like modules, wherein a bottom surface of the lower piece is curved or bent such that a portion just under the shaft portion is the highest in a state before the securing member is mounted on the mounting target, and if the securing member is mounted, the bottom surface is deformed to be made into a state of being along the mounting target.

2. The securing member according to claim 1, further including:
    through-holes that are formed on the lower piece at both sides with respect to the shaft portion and penetrate through the lower piece in the up-down direction, and
    an auxiliary securing portion that has striking portions which are inserted into the through-holes from the lower sides and which have upper ends each of which strikes the lower surfaces of the adjacent plate-like modules if the lower piece is mounted on the mounting target through the mounting hole.

3. A securing member comprising:
    an upper piece that is capable of abutting against upper surfaces of two adjacent plate-like modules and extends in a right-left direction;
    a shaft portion having a single wall and integrally formed with the upper piece that extends downward from a center of the upper piece, both sides of the single wall abutting side surfaces of the adjacent plate-like modules;
    a lower piece integrally formed with the shaft portion that extends to both sides from a lower end of the shaft portion so as to be larger than the upper piece and has abutment portions which are capable of abutting against lower surfaces of the adjacent plate-like modules on upper portions of the lower piece;
    a mounting hole that is formed on the lower piece at one side of both sides with respect to the shaft portion and penetrates through the lower piece in an up-down direction; wherein the lower piece is mounted on a mounting target of the adjacent plate-like modules through the mounting hole in a state where the side surfaces of the adjacent plate-like modules are made to abut against the shaft portion so that the upper piece is lowered to abut against the upper surfaces of the adjacent plate-like modules and the abutment portions of the lower piece abut against the lower surfaces of the adjacent plate-like modules;
    through-holes that are formed on the lower piece at both sides with respect to the shaft portion and penetrate through the lower piece in the up-down direction, and
    an auxiliary securing portion that has striking portions which are inserted into the through-holes from the lower sides and which have upper ends each of which strikes the lower surfaces of the adjacent plate-like modules if the lower piece is mounted on the mounting target through the mounting hole.

4. A securing member for securing adjacent plate-like modules having a predetermined number of surfaces on a mounting target comprising:
    an upper piece extending in a horizontal direction for abutting against at least a part of a first surface of two or more of the adjacent plate-like modules;
    a shaft portion having a single wall integrally formed at one end with the upper piece extending in a vertical direction for abutting against at least a part of a second surface of two or more of the adjacent plate-like modules; and
    a lower piece integrally formed with the shaft portion and extending in a horizontal direction from the other end of shaft portion for abutting against at least a part of a third surface of two or more of the adjacent plate-like modules, wherein at least a part of the lower piece is resiliently formed to have a curved line along the horizontal direction.

5. The securing member for securing adjacent plate-like modules according to claim 4 wherein at least one mounting hole formed on the lower piece penetrates through the lower piece in the vertical direction for holding a fastener to anchor the securing member onto the mounting target.

6. The securing member for securing adjacent plate-like modules according to claim 4 wherein the adjacent plate-like modules each further includes a flange portion.

7. The securing member for securing adjacent plate-like modules according to claim 4 wherein the adjacent plate-like modules each further includes a groove.

8. The securing member for securing adjacent plate-like modules according to claim 4 wherein the lower piece further includes an abutment portion.

9. The securing member according to claim 4, further including:
    through-holes formed on the lower piece at both sides with respect to the shaft portion and penetrate through the lower piece in the vertical direction, and an auxiliary securing portion having striking portions to be inserted into the through-holes and upper ends at one end of the striking portions each engages the plate-like module.

10. A securing member for securing adjacent plate-like modules having a predetermined number of surfaces on a mounting target comprising:
- an upper piece extending in a horizontal direction for abutting against at least a part of a first surface of two or more of the adjacent plate-like modules;
- a shaft portion having a single wall integrally formed at one end with the upper piece extending in a vertical direction for abutting against at least a part of a second surface of two or more of the adjacent plate-like modules;
- a lower piece integrally formed with the shaft portion and extending in a horizontal direction from the other end of shaft portion for abutting against at least a part of a third surface of two or more of the adjacent plate-like modules;
- through-holes formed on the lower piece at both sides with respect to the shaft portion and penetrate through the lower piece in the vertical direction, and
- an auxiliary securing portion having striking portions to be inserted into the through-holes and upper ends at one end of the striking portions each engages the plate-like module.

11. A securing member comprising:
- an upper piece that is capable of abutting against an upper surface of a plate-like module or is capable of being inserted into a groove formed on a side surface of the plate-like module, and extends in a right-left direction;
- a shaft portion that extends downward from a center of the upper piece;
- a lower piece that extends to both sides from a lower end of the shaft portion so as to be larger than the upper piece and has an abutment portion which is capable of abutting against a lower surface of the plate-like module on an upper portion of the lower piece; and
- a mounting hole that is formed on the lower piece at one side of both sides with respect to the shaft portion and penetrates through the lower piece in an up-down direction,
- wherein the lower piece is mounted on a mounting target of the plate-like module through the mounting hole in a state where the side surface of the plate-like module is made to abut against or be close to the shaft portion so that the upper piece is lowered to abut against the upper surface of the plate-like module or a surface in the groove and the abutment portion of the lower piece abuts against the lower surface of the plate-like module,
- wherein a bottom surface of the lower piece is curved or bent such that a portion just under the shaft portion is the highest in a state before the securing member is mounted on the mounting target, and if the securing member is mounted, the bottom surface is deformed to be made into a state of being along the mounting target.

* * * * *